(12) United States Patent
Salter et al.

(10) Patent No.: US 11,036,226 B2
(45) Date of Patent: Jun. 15, 2021

(54) SYSTEM AND METHOD FOR PREVENTING UNWANTED DISMISSAL OF AUTONOMOUS VEHICLE

(71) Applicant: Ford Global Technologies, LLC, Dearborn, MI (US)

(72) Inventors: Stuart C. Salter, White Lake, MI (US); Kristopher Brown, Dearborn, MI (US); Annette Lynn Huebner, White Lake, MI (US); David Brian Glickman, Southfield, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 16/256,058

(22) Filed: Jan. 24, 2019

(65) Prior Publication Data
US 2020/0241529 A1 Jul. 30, 2020

(51) Int. Cl.
*G05D 1/00* (2006.01)
*G05D 1/02* (2020.01)
*G06Q 50/30* (2012.01)
*B60Q 9/00* (2006.01)
*G06K 9/00* (2006.01)

(52) U.S. Cl.
CPC ............. *G05D 1/0088* (2013.01); *B60Q 9/00* (2013.01); *G05D 1/021* (2013.01); *G06Q 50/30* (2013.01); *G06K 9/00832* (2013.01)

(58) Field of Classification Search
CPC .................................................... G05D 1/0088
See application file for complete search history.

(56) References Cited

U.S. PATENT DOCUMENTS

| 9,739,226 | B2 * | 8/2017 | Elwart ................... | B60K 28/04 |
| 9,823,081 | B2 | 11/2017 | Crawford et al. | |
| 9,910,438 | B1 | 3/2018 | Arden et al. | |
| 10,008,069 | B2 * | 6/2018 | Elie ......................... | G07B 15/00 |
| 10,088,846 | B2 * | 10/2018 | Gao ......................... | H04W 4/02 |
| 10,150,448 | B2 * | 12/2018 | Huennekens ........... | G08B 21/22 |
| 10,303,961 | B1 * | 5/2019 | Stoffel .................... | B60Q 3/76 |
| 10,379,533 | B2 * | 8/2019 | Bier ................... | G01C 21/3492 |
| 10,386,835 | B2 * | 8/2019 | Vogt ..................... | G05D 1/0238 |

(Continued)

OTHER PUBLICATIONS

Walther Wachenfeld, et al. "Use Cases for Autonomous Driving," Springer, Autonomous Driving, 2016, XV, 706 pp. 9-37. http://www.springer.com/978-3-662-48845-4.

(Continued)

*Primary Examiner* — Michael A Berns
(74) *Attorney, Agent, or Firm* — David Coppiellie; Carlson, Gaskey & Olds, P.C.

(57) ABSTRACT

This disclosure relates to a system and method for preventing an unwanted dismissal of an autonomous vehicle. This disclosure may be particularly useful when the autonomous vehicle is used in on-demand transportation applications, including ridesharing applications, or shuttle applications. An example method includes identifying a condition indicating an autonomous vehicle should remain stationary, and taking an action configured to prevent unwanted dismissal of an autonomous vehicle when the condition has been identified. Several example conditions and actions are discussed in the written description.

17 Claims, 6 Drawing Sheets

(56) References Cited

U.S. PATENT DOCUMENTS

| | | | |
|---|---|---|---|
| 10,459,440 B2* | 10/2019 | Rust | G05D 1/0287 |
| 10,479,328 B2* | 11/2019 | Reibling | G06Q 50/30 |
| 10,679,487 B1* | 6/2020 | Farivar | G08B 21/24 |
| 2016/0301698 A1 | 10/2016 | Katara et al. | |
| 2017/0080900 A1 | 3/2017 | Huennekens et al. | |
| 2017/0153714 A1 | 6/2017 | Gao et al. | |
| 2017/0249797 A1 | 8/2017 | Elie et al. | |
| 2018/0126960 A1 | 5/2018 | Reibling et al. | |
| 2018/0202822 A1* | 7/2018 | DeLizio | G05D 1/0276 |
| 2020/0241529 A1* | 7/2020 | Salter | G06Q 50/30 |

OTHER PUBLICATIONS

Richard Truett, "Every Part of a Self-driving Car Will Change, Even the Doors," Autonews article. Downloaded from http://www.autonews.com/article/20181009/BLOG06/181009646/every-part-of-a-self-driving-car-will-change-even-the-doors. Posted Oct. 9, 2018.

* cited by examiner

SYSTEM AND METHOD FOR PREVENTING UNWANTED DISMISSAL OF AUTONOMOUS VEHICLE

TECHNICAL FIELD

This disclosure relates to a system and method for preventing an unwanted dismissal of an autonomous vehicle. This disclosure may be particularly useful when the autonomous vehicle is used in on-demand transportation applications, including ridesharing applications, or shuttle applications.

BACKGROUND

There are various levels of autonomous vehicles. Semi-autonomous vehicles relieve a driver of some driving-related tasks. Fully autonomous vehicles do not require a driver at all, and instead use a self-driving system (SDS), which includes sensors, cameras, radar, etc., to sense its surroundings and guide itself between destinations without a human operator.

Fully autonomous vehicles are being developed for use in on-demand transportation. In such applications, a user may request a ride from a nearby autonomous vehicle via an app or website, as examples. Once the ride is confirmed, the autonomous vehicle will arrive at the user's pick-up location, allow the user to enter the vehicle, and drive the user to their drop-off location (i.e., destination). In ridesharing applications, the autonomous vehicle may pick up and drop off additional users at other pick-up and drop-off locations. In shuttle applications, the autonomous vehicle drives on a predetermined route and stops at predetermined stops along the route.

SUMMARY

A method according to an exemplary aspect of the present disclosure includes, among other things, identifying a condition indicating an autonomous vehicle should remain stationary, and taking an action configured to prevent unwanted dismissal of an autonomous vehicle when the condition has been identified.

In a further non-limiting embodiment of the foregoing method, the method includes permitting dismissal of the autonomous vehicle when the identified condition has been resolved.

In a further non-limiting embodiment of any of the foregoing methods, dismissal is permitted only after a countdown occurs, and a user is permitted to override the dismissal during the countdown.

In a further non-limiting embodiment of any of the foregoing methods, the method includes determining the identified condition has been resolved by interpreting an input from a user.

In a further non-limiting embodiment of any of the foregoing methods, dismissal is permitted only when an authenticated input is received.

In a further non-limiting embodiment of any of the foregoing methods, the autonomous vehicle includes a first human-machine interface on a first side of the autonomous vehicle and a second human-machine interface on a second side of the autonomous vehicle opposite the first side, and the first and second human-machine interfaces permit the user to provide the input.

In a further non-limiting embodiment of any of the foregoing methods, the action includes activating only one of the first human-machine interface and the second human-machine interface based on a side of the autonomous vehicle the user has exited.

In a further non-limiting embodiment of any of the foregoing methods, the side is determined based on a location where the user was seated within the autonomous vehicle.

In a further non-limiting embodiment of any of the foregoing methods, the action further includes activating only a portion of the activated one of the first human-machine interface and the second interface based on a height of the user.

In a further non-limiting embodiment of any of the foregoing methods, the first and second human-machine interfaces are touch screens.

In a further non-limiting embodiment of any of the foregoing methods, the action includes permitting the user to exit on only one side of the autonomous vehicle.

In a further non-limiting embodiment of any of the foregoing methods, the condition includes a personal article remaining in the autonomous vehicle, and the action includes issuing an alert indicating the personal article remains in the vehicle.

In a further non-limiting embodiment of any of the foregoing methods, the condition includes luggage remaining in a cargo area of the autonomous vehicle, and the action includes issuing an alert indicating the luggage remains in the cargo area vehicle.

In a further non-limiting embodiment of any of the foregoing methods, the condition includes a user actively exiting the vehicle.

In a further non-limiting embodiment of any of the foregoing methods, the condition includes a user failing to begin a process of exiting the autonomous vehicle within a predetermined time of the autonomous vehicle arriving at a destination of the user.

A system for an autonomous vehicle according to an exemplary aspect of the present disclosure includes, among other things, at least one sensor and a controller in electronic communication with the at least one sensor. The controller is configured to interpret information from the at least one sensor to identify a condition indicating the autonomous vehicle should remain stationary, and, when the condition is identified, the controller is further configured to issue a command to prevent unwanted dismissal of the autonomous vehicle.

In a further non-limiting embodiment of the foregoing system, the at least one sensor includes at least one of a camera, weight sensor, and a wireless sensor.

In a further non-limiting embodiment of any of the foregoing systems, the system includes first and second human-machine interfaces on opposite sides of the autonomous vehicle. The first and second human-machine interfaces are configured to be selectively activated in response to the command from the controller.

In a further non-limiting embodiment of any of the foregoing systems, the controller is configured to issue a command activating only one of the first and second human-machine interfaces based on a side of the autonomous vehicle a user has exited, and the controller is configured to issue a command activating only a portion of the activated one of the first and second human-machine interfaces based on a height of a user.

In a further non-limiting embodiment of any of the foregoing systems, the condition includes one or more of a personal article remaining in the autonomous vehicle, a user actively exiting the vehicle, or a user failing to begin a process of exiting the autonomous vehicle within a predetermined time of the autonomous vehicle arriving at a destination of the user.

BRIEF DESCRIPTION OF THE DRAWINGS

In FIG. 3, the passenger cabin is in a first configuration.

In FIG. 4, the passenger cabin is in a second configuration.

DETAILED DESCRIPTION

This disclosure relates to a system and method for preventing an unwanted dismissal of an autonomous vehicle. This disclosure may be particularly useful when the autonomous vehicle is used in on-demand transportation applications, including ridesharing applications, or shuttle applications. An example method includes identifying a condition indicating an autonomous vehicle should remain stationary, and taking an action configured to prevent unwanted dismissal of an autonomous vehicle when the condition has been identified. Several example conditions and actions are discussed below. This disclosure reduces the likelihood that the autonomous vehicle receives a malicious or accidental input, which may cause undesired vehicle behavior. Further, this disclosures strikes a balance between reducing the time the autonomous vehicle is stopped while also increasing security and providing adequate time for passengers to comfortably exit the autonomous vehicle and remove their luggage, for example. In this way, this disclosure increases efficiency while also increasing passenger comfort and satisfaction. These and other benefits will be appreciated from the below description.

Figure 1:
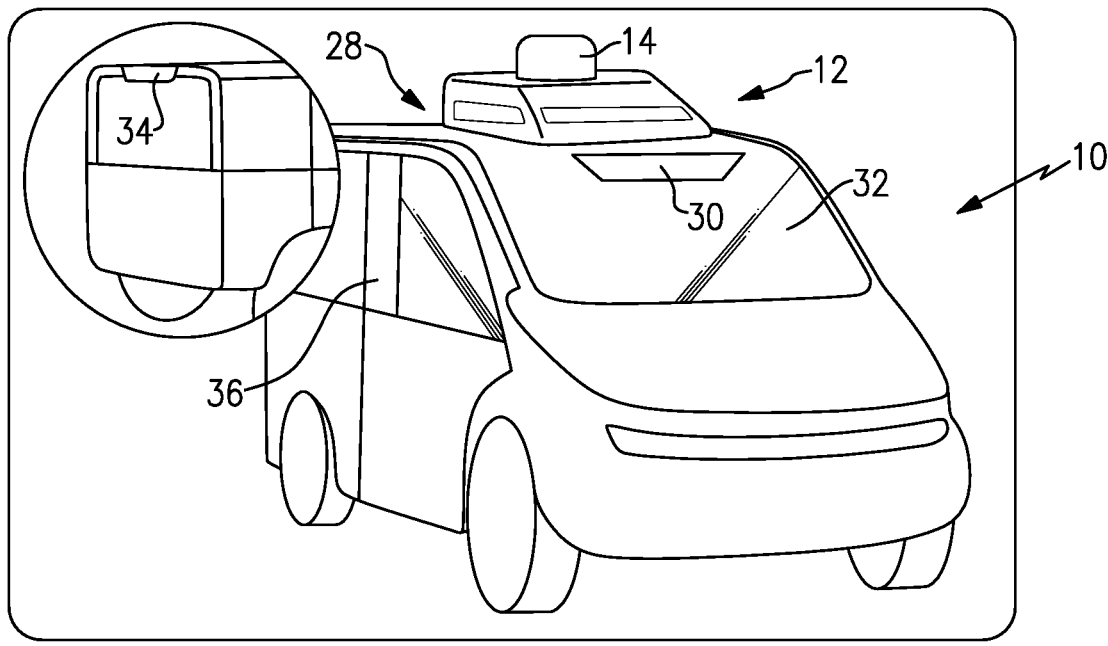
FIG. 1 is a front-perspective view of an example autonomous vehicle with a breakout showing a rear-perspective view of the same.

Referring to the drawings, FIG. 1 is a view of an example autonomous vehicle 10, and in particular is a fully autonomous vehicle configured to sense its surroundings and control and guide itself between destinations without a human operator. The autonomous vehicle 10 includes a self-driving system (SDS), various components of which will be discussed below. The example autonomous vehicle 10 is classified as a "Level 5" autonomous vehicle under the ranking system published by the Society of Automotive Engineers (SAE). While the autonomous vehicle 10 is shown as a passenger van, this disclosure is not limited to any particular vehicle type, and extends to other types of autonomous vehicles, including autonomous cars, trucks, and sport utility vehicles, as examples.

The autonomous vehicle 10 includes an exterior sensor system 12 for detecting various conditions corresponding to the external surroundings of the autonomous vehicle 10. In FIG. 1, a sensor 14 on top of the autonomous vehicle is a light detection and ranging (LIDAR) sensor. The sensor 14 is one of a plurality of sensors mounted to the exterior of the autonomous vehicle 10. The exterior sensor system 12 also includes additional exterior sensors, as shown schematically in FIG. 2. For example, the exterior sensor system 12 includes a forward-facing sensor 16, a plurality of side sensors 18, 20, 22, 24, and a rear-facing sensor 26. The sensors 16, 18, 20, 22, 24, 26 may be provided by one or more of image sensors, such as cameras, radio detecting and imaging (RADAR) sensors, LIDAR sensors, and wireless sensors systems utilizing Bluetooth® low energy (BLE) technology, as examples. The locations of the sensors 14, 16, 18, 20, 22, 24, 26 are exemplary only. It should be understood that this disclosure extends to autonomous vehicles that have different exterior sensor systems.

Figure 2:
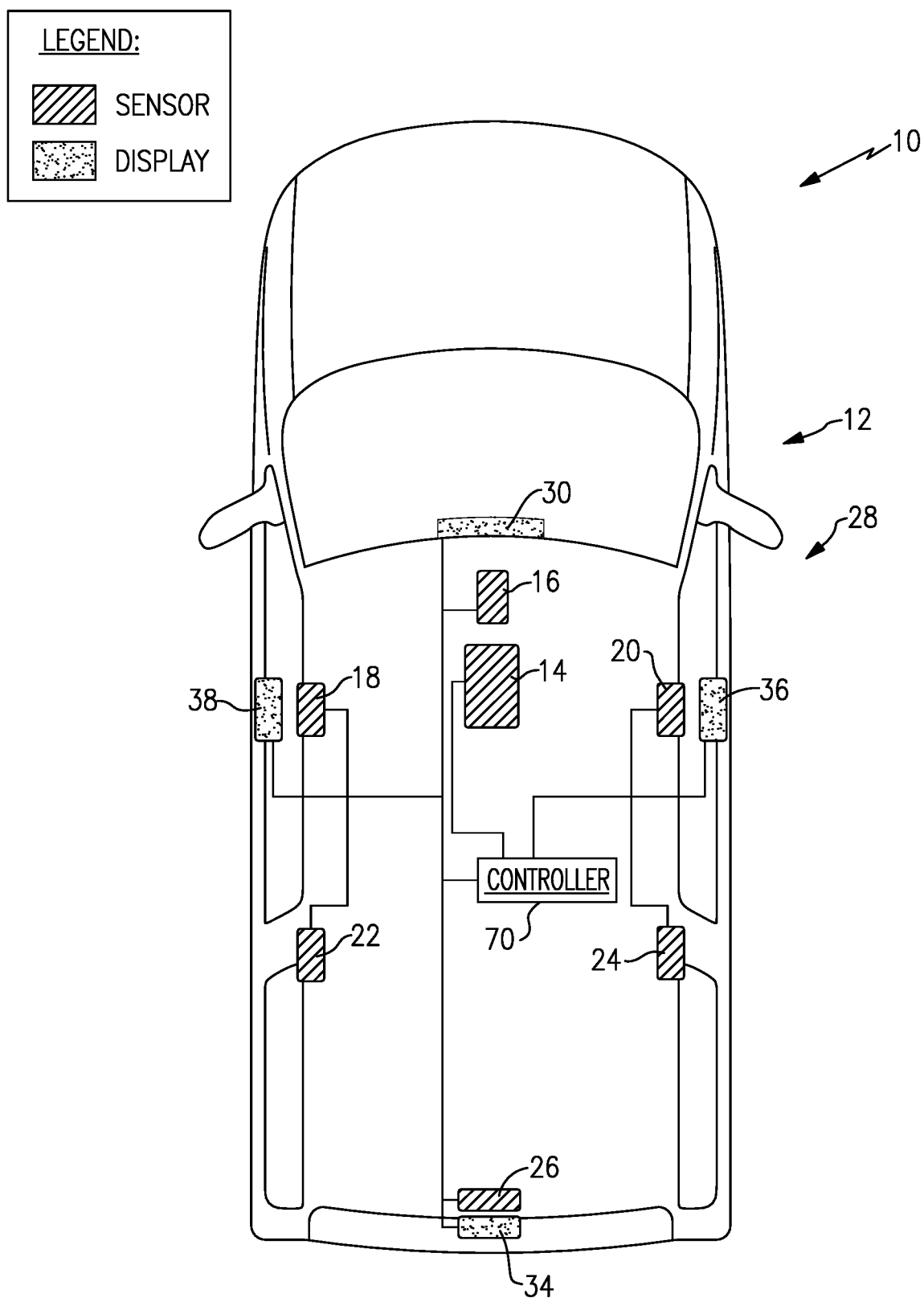
FIG. 2 is a schematic view of the example autonomous vehicle from a top perspective, and in particular schematically illustrates various systems of the autonomous vehicle.

The autonomous vehicle 10 further includes an exterior display system 28 including a plurality of electronic appliqués, screens, and/or human-machine interfaces such as touchscreens. FIG. 1 shows a forward-facing exterior display 30 on a top of the front windshield 32 of the autonomous vehicle 10. FIG. 1 also shows a rear-facing exterior display 34 mounted to a rear of the autonomous vehicle 10. The autonomous vehicle 10 also includes at least two side-facing exterior displays 36 (FIGS. 1 and 2), 38 (FIG. 2). Each of the exterior displays 30, 34, 36, 38 may display information visible to those outside the autonomous vehicle 10. Further, the side-facing exterior displays 36, 38 may be human-machine interfaces, such as touchscreens, which permit users to input information.

Figure 3:
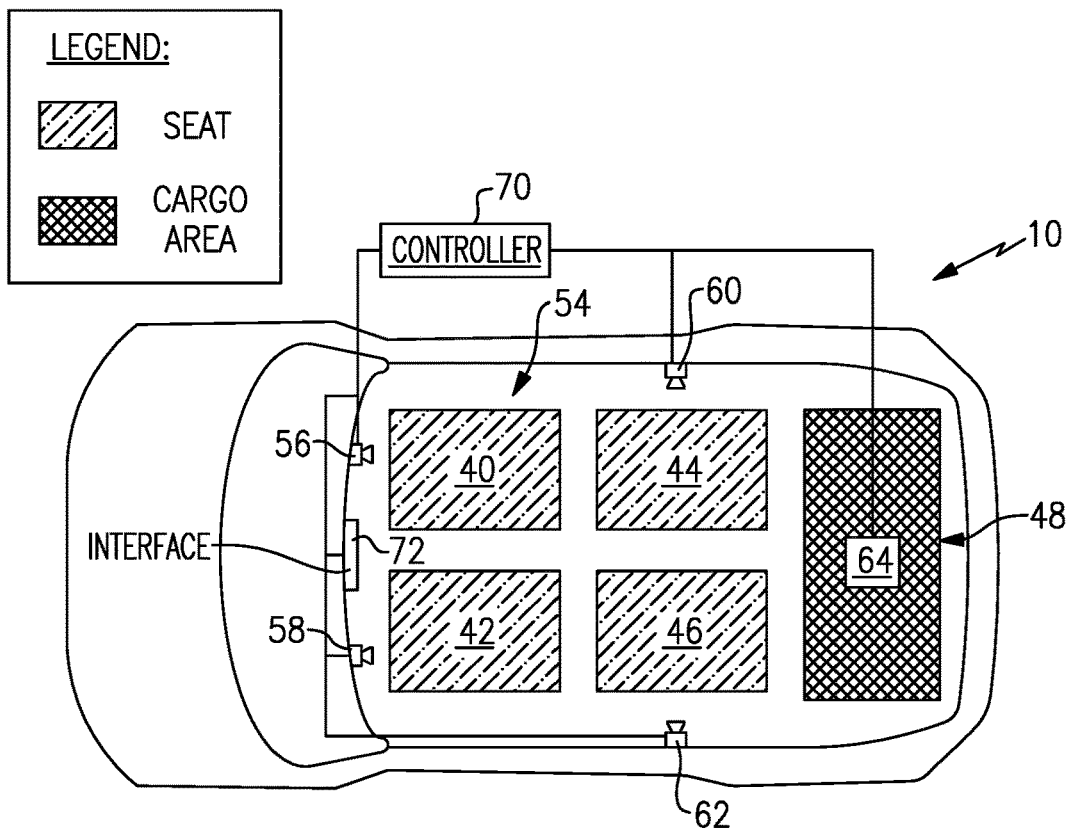
FIG. 3 is a schematic view of the example autonomous vehicle showing various sensors arranged relative to the passenger cabin and cargo area.
Figure 4:
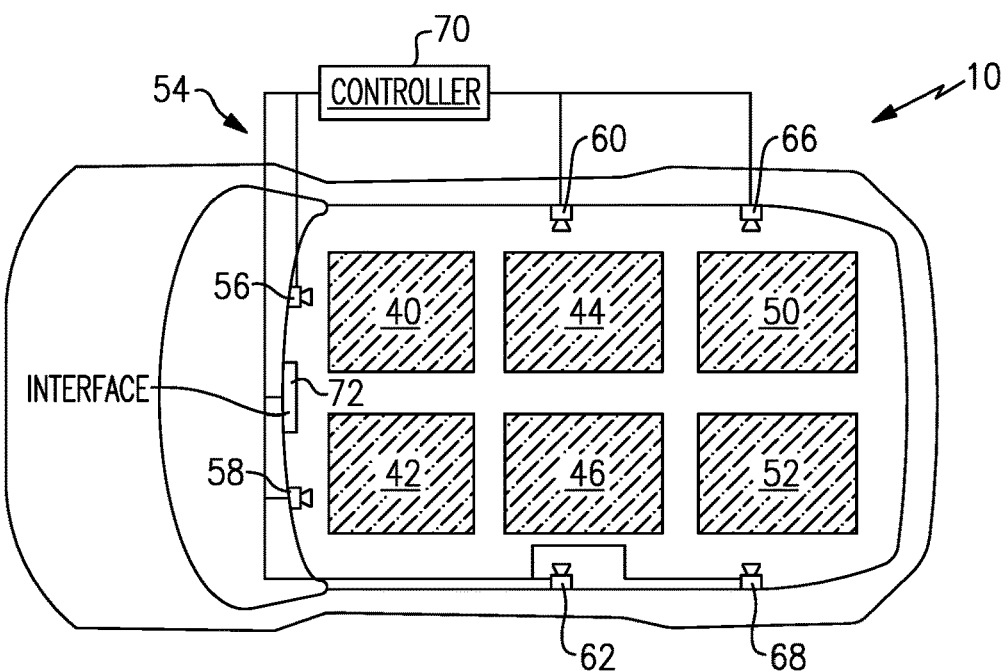
FIG. 4 is another schematic view of the example autonomous vehicle showing various sensors arranged relative to the passenger cabin.

FIGS. 3 and 4 schematically illustrate exemplary configurations of the interior of the autonomous vehicle 10. In FIG. 3, the autonomous vehicle 10 includes a passenger cabin having four passenger seats 40, 42, 44, 46 and a cargo area 48. In FIG. 4, the autonomous vehicle 10 does not include a cargo area, but rather includes two additional seats 50, 52 in its passenger cabin. It should be understood that the configurations of FIGS. 3 and 4 may be different configurations of the same autonomous vehicle. For instance, the seats 50, 52 may be folding seats and, when folded, they create the cargo area 48. The seats 40, 42, 44, 46, 50, 52 may be bucket seats or bench seats, as examples. While two exemplary configurations are shown in FIGS. 3 and 4, this disclosure extends to other passenger cabin and cargo area configurations.

Regardless of the seating configuration, the autonomous vehicle 10 includes an interior sensor system 54. In FIG. 3, the interior sensor system 54 includes a plurality of image sensors 56, 58, 60, 62, such as cameras, facing the seats 40, 42, 44, 46, and at least one weight sensor 64 in the cargo area 48. One or more of the sensors 56, 58, 60, 62 may also be wireless sensors systems utilizing BLE technology. While a particular arrangement of sensors is shown in FIG. 3, this disclosure extends to other sensor arrangements. In FIG. 4, for example, since there is no cargo area, there are no weight sensors, and thus additional sensors 66, 68 may be arranged adjacent the seats 50, 52. The sensors 66, 68 may be the same type of sensors as the sensors 56, 58, 60, 62.

The autonomous vehicle 10 further includes a controller 70 in electronic communication with each component of the exterior sensor system 12, exterior display system 28, and the interior sensor system 54. In particular, the controller 70 is configured to receive information from each sensor and display associated with the various systems 12, 28, 54, and is further configured to interpret that information and issue commands to various components of the autonomous vehicle 10 based on that information. The controller 70 is shown schematically in FIGS. 2-4. It should be understood that the controller 70 may include hardware and software, and could be part of an overall vehicle control module, such as a vehicle system controller (VSC), or could alternatively be a stand-alone controller separate from the VSC. Further, the controller 70 may be programmed with executable instructions for interfacing with and operating the various components of the autonomous vehicle 10. The controller 70 additionally includes a processing unit and non-transitory memory for executing the various control strategies and modes of the vehicle system.

The controller 70 is also in communication with one or more human-machine interfaces. One example human-machine interface (HMI) 72 is shown schematically in FIGS. 3 and 4. The human-machine interface 72 is provided in a vehicle cabin and is accessible by a user, such as a passenger, from within the autonomous vehicle 10. In this disclosure, the terms "user" and "passenger" are essentially used interchangeably, depending on context. In particular, the term passenger may be used to refer to prospective passengers (i.e., before they have boarded the vehicle), current passengers, and former passengers (i.e., passengers that have exited the vehicle). The term "user" is also inclusive of prospective passengers, passengers, and former passengers, depending on the context in which it is used.

The human-machine interface 72 is provided by an interactive display, such as a graphical user interface (GUI), in this example. In one particular example, the human-machine interface 72 includes a touchscreen, which is configured to display information to the user and allow the user to provide inputs.

Figure 5:
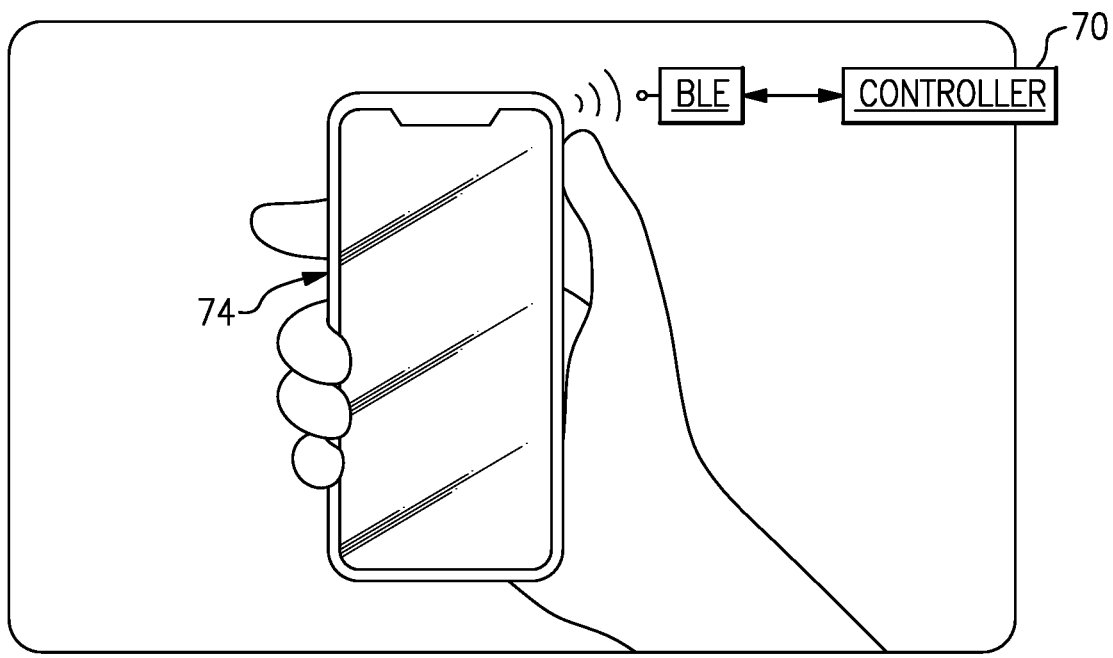
FIG. 5 schematically illustrates an example mobile device in electronic communication with the controller of the autonomous vehicle.

Another example human-machine interface is a mobile device 74, as shown in FIG. 5. The mobile device 74 may be a cell phone of a passenger or prospective passenger of the autonomous vehicle 10. As with the human-machine interface 72, a user may be allowed to provide inputs and to receive information via the mobile device 74. In one example, the user provides inputs and receives information via a software application running on the mobile device 74. The mobile device 74 may be in electronic communication with the controller 70 wirelessly over a BLE connection or over the Internet, as examples. In the example of the BLE connection, one or more of the sensors of the exterior sensor system 12 or the interior sensor system 54 may establish the wireless connection between the mobile device 74 and the controller 70.

Figure 6:
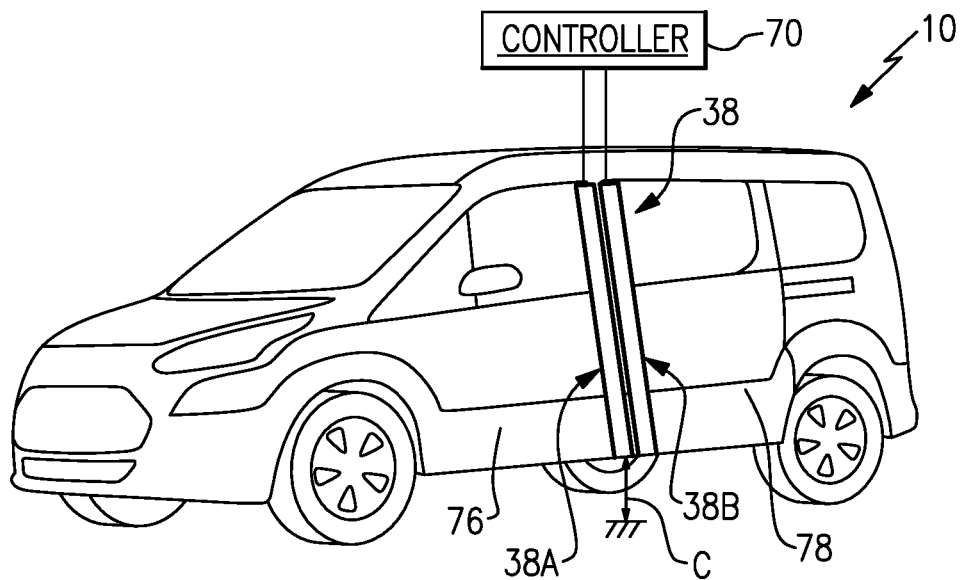
FIG. 6 is a side-perspective view of the autonomous vehicle, and illustrates two exemplary side-facing exterior displays.

Yet another example human-machine interface may be provided by the side-facing exterior displays 36, 38. FIG. 6 illustrates an example where the side-facing exterior display 38 includes two side-facing displays 38A, 38B on one side of the autonomous vehicle 10. While only one side of the autonomous vehicle 10 is shown in FIG. 6, it should be understood that the opposite side of the autonomous vehicle 10 may also include two similarly-arranged side-facing displays.

The side-facing displays 38A, 38B are mounted on a front door 76 and a rear door 78 of the autonomous vehicle 10, respectively. The front door 76 is a driver-side door, in this example, and the rear door 78 is a rear sliding door. The side-facing display 38A is mounted to an external surface adjacent a rear edge of the front door 76, and the side-facing display 38B is mounted to an external surface adjacent a front edge of the rear door 78. The side-facing displays 38A, 38B extend continuously from substantially the bottom to the top of the respective door 76, 78. In particular, the side-facing displays 38A, 38B begin at the bottom of the respective doors 76, 78, which are spaced-above a ground surface by a clearance C, and extend to substantially the top of the respective doors 76, 78.

The side-facing displays 38A, 38B are oriented on the autonomous vehicle 10 such that a user can readily input information and discern information displayed on the side-facing displays, for example. The side-facing displays 38A, 38B may be a capacitive touch displays or other known touch-sensitive displays operated by a user interacting with visual elements and images provided on the side-facing displays 38A, 38B.

The side-facing displays 38A, 38B are in communication with the controller 70. The controller 70 controls operation of the side-facing displays 38A, 38B. Cameras, such as the sensors 18, 22, may be orientated relative to the side-facing displays 38A, 38B to obtain images of a user (i.e., passenger or prospective passenger) that are then used to tailor input images generated on the side-facing displays 38A, 38B to physical characteristics of the individual user. In this way, the autonomous vehicle 10 tailors images generated on the side-facing displays 38A, 38B to user-specific characteristics to improve the operational experience and increase security.

Figure 7:
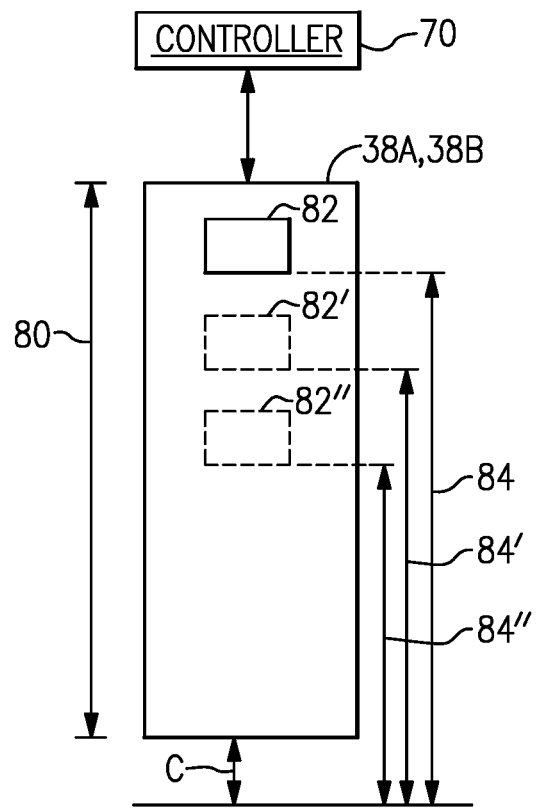
FIG. 7 schematically illustrates additional detail of the side-facing exterior displays.

Referring to FIG. 7, and with continued reference to FIG. 6, the example side-facing displays 38A, 38B include a height 80. The height 80 enables an input image 82 to be positioned at various heights along the side-facing displays 38A, 38B. In one example, the controller 70 obtains information indicative of a specific physical characteristic of a user and uses that characteristic to tailor the position of the input image 82. The information may be input into a software application, where the user may have saved their height in their profile, for example. Alternatively, the information may be obtained from one or more of the sensors of the exterior or interior sensor systems 12, 54.

In one particular example, the input image 82 is displayed at a specific height 84 relative to the ground to provide an optimal orientation of the input image 82 with respect to the specific physical characteristics of the user. In another example, an input image 82' is disposed at a height 84' above the ground. In still another example, an input image 82" is disposed at a height 84" above the ground. Each of the input image heights 84, 84' and 84" are adapted to the specific user to provide an optimal location of the input image 82 relative to the physical characteristics of the user to both aid and input information into the input image 82 and also to provide a location of the input image 82 that deters others, such as children, from observing the image and providing an input. In particular, providing a variable input image height prevents nuisances and pranks, where others may input incorrect information, either unintentionally or intentionally. It should be appreciated that although three different heights 84, 84' and 84" are disclosed by way of example, the height is not limited to certain positions, but is instead determined based on a determination of the height of a user.

While referred to as an "input image" 82, the input image 82 is merely an activated section of the side-facing displays 38A, 38B. The input image 82 may display information, including a message and/or a keypad or other input buttons, and allow a user to input information by way of the side-facing displays 38A, 38B, which again may be touch-screens. The input image 82 will only be activated and displayed at one location on the side-facing displays 38A, 38B at a time. For instance, with reference to FIG. 7, when the input image 82 is activated at height 84, an input image will not be displayed at heights 84' or 84".

While the side of the autonomous vehicle 10 shown in FIG. 6 has two side-facing displays 38A, 38B, this disclosure extends to autonomous vehicles with one or more side-facing displays. Further, this disclosure extends to autonomous vehicles without side-facing displays that rely solely on other human-machine interfaces, such as those inside a vehicle cabin or those provided by mobile devices.

Figure 8:
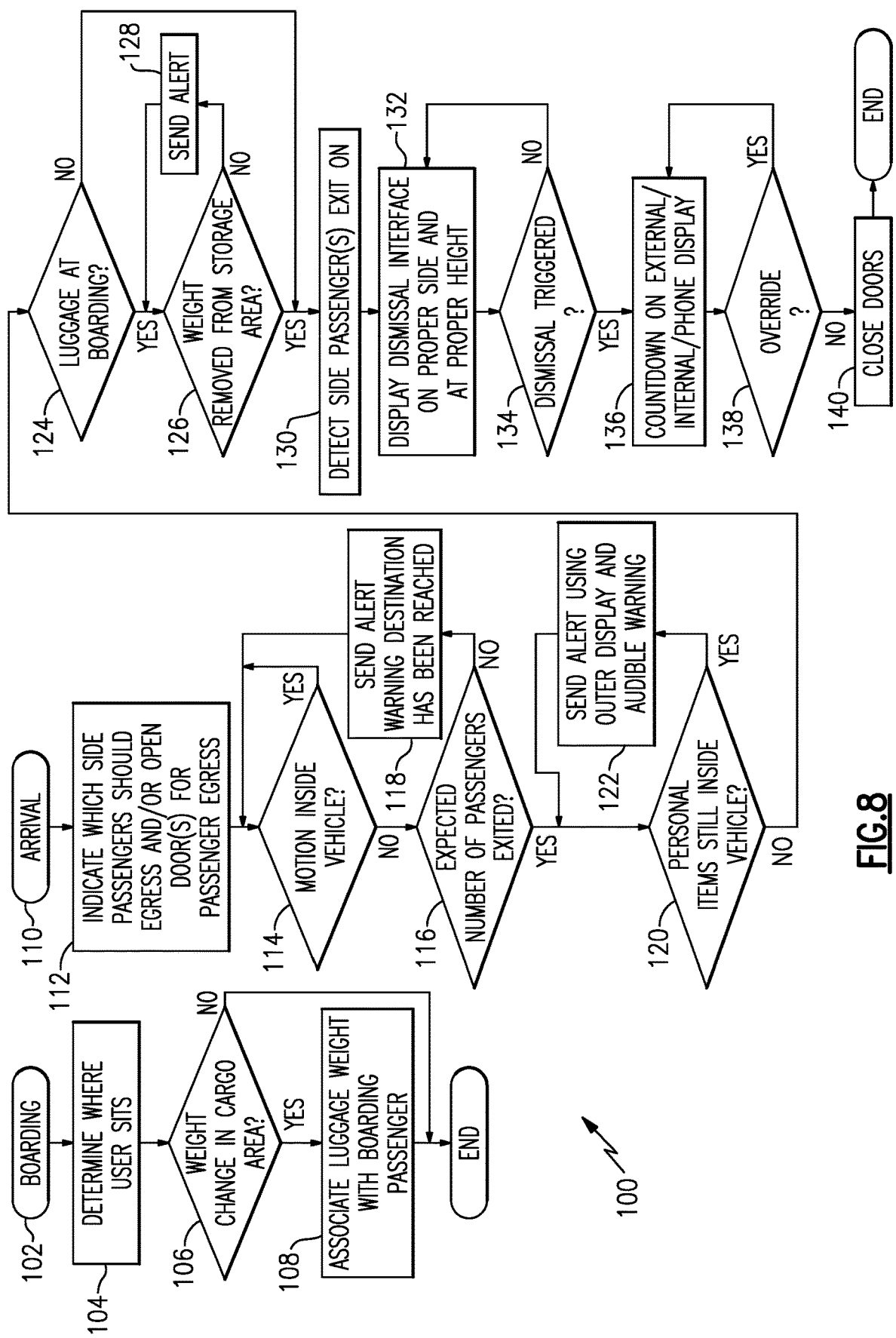
FIG. 8 is a flow chart representative of a method of this disclosure.

The autonomous vehicle 10, together with any mobile device(s) 74, provide a "system" according to this disclosure. The controller 70, which is also part of the system, is configured to perform a method 100, which is represented in FIG. 8. The system and method of this disclosure are configured to prevent unwanted dismissal of the autonomous vehicle 10.

Specifically, in on-demand transportation applications, a user may summon the autonomous vehicle 10 by requesting a ride using their mobile device 74. Once the ride is confirmed, the autonomous vehicle 10 will arrive at the user's pick-up location, allow the user to enter, and drive the user to their drop-off location (i.e., destination). At the drop-off location, the vehicle ideally will only be "dismissed," meaning permitted to leave the drop-off location, when the correct user or users have exited the autonomous vehicle, removed all of their personal belongings from the passenger cabin and/or cargo area, and either closed the doors of the autonomous vehicle 10 or indicated that it is safe for the autonomous vehicle 10 to automatically close its doors. The term "unwanted dismissal" refers to a dismissal that is premature or undesired because one or more conditions, such as those mentioned in the immediately preceding sentence, are still present, indicating that the autonomous vehicle 10 should remain stationary.

In this disclosure, the controller 70 is in electronic communication with at least one sensor, such as one of the sensors from the exterior sensor system 12 or interior sensor system 54, and the controller 70 is configured to interpret information from the sensor(s) to identify a condition indicating the autonomous vehicle should remain stationary. Examples of such conditions will be discussed below with reference to the method 100. When such a condition is identified, the controller 70 is configured to take some action, such as issuing a command to one or more components of the autonomous vehicle 10, to prevent unwanted dismissal of the autonomous vehicle 10.

Again, FIG. 8 is a flow chart representative of an example method 100. It should be understood that the method 100 will be performed by the controller 70 and other components of the autonomous vehicle 10, such as those discussed above relative to FIGS. 1-7.

Various aspects of the method 100 will now be described relative to an example trip taken by a user. For instance, in a first aspect of the method 100, the user may summon the autonomous vehicle 10 by requesting a ride using their mobile device 74. After the ride is confirmed, the autonomous vehicle 10 arrives at the user's pick-up location and allows the user to enter the autonomous vehicle 10. This process is referred to as boarding, at 102. During boarding, the controller 70 interprets information from the various sensor systems 12, 54 to determine where the user sits, at 104, and whether the user has placed any personal articles, such as luggage or other items in the vehicle, at 106. At 104, the interior sensor system 54 may relay images to the controller 70 which the controller 70 can interpret as a new human body being present in one of the seats 40, 42, 44, 46, 50, 52, as examples. At 106, the controller 70 may receive information from the weight sensor 64 indicative of an increase in weight in the cargo area 48 during the boarding process. Any increase in weight is associated with the user or users that are boarding during the board process, at 108. This and other information gathered during the boarding process may be used once the autonomous vehicle 10 arrives at a drop-off location to prevent unwanted dismissal of the autonomous vehicle 10.

When the autonomous vehicle 10 arrives at the user's drop-off location, at 110, the autonomous vehicle 10 indicates which side of the vehicle the user should exit, at 112. In one example, this information is conveyed to the user using the human-machine interface 72 or the user's mobile device 74. In one further example, the autonomous vehicle 10 may require the user to exit only on a particular side of the autonomous vehicle 10, due to potentially dangerous traffic conditions on the opposite side, for example. Optionally, the autonomous vehicle 10 may automatically open the door or doors on side of the autonomous vehicle 10 that the user(s) should exit. Opening the door may include unlocking the door, or may additionally mean that the door is automatically opened by the autonomous vehicle 10.

The exterior and interior sensor systems 12, 54 continually monitor activity within the passenger cabin and immediately outside the autonomous vehicle 10 during the arrival process. At 114, the controller 70 uses information from the interior sensor system 54 to determine whether there is motion within the autonomous vehicle 10 indicative of one or more passengers actively exiting the autonomous vehicle 10. If the controller 70 determines that a passenger is still actively exiting the autonomous vehicle, the controller 70 prevents dismissal of the autonomous vehicle 10. In other words, the controller 70 issues a command keeping the autonomous vehicle 10 stationary until the condition is resolved, and in particular until the user exits the autonomous vehicle 10.

Further, the controller 70 typically knows how many passengers are expected to exit at a particular drop-off location. The controller 70 may take into account any passengers that have changed their drop-off location after boarding. The controller 70 may use information from the exterior and interior sensor systems 12, 54 to confirm that the expected number of users have exited the autonomous vehicle 10 at a particular drop-off location, at 116. If the expected number of passengers have not exited, and there is no motion in the vehicle, the controller 70 may issue an alert, at 118, warning all occupants of the autonomous vehicle 10 that the destination has been reached. The alert may be played audibly in the autonomous vehicle 10, displayed on the human-machine interface 72, and/or sent to the user's mobile device 74. The alert issued in step 118 may be useful when a user has not noticed that the autonomous vehicle 10 has approached their designated drop-off location, such as when a user is daydreaming or has fallen asleep.

When all passengers have exited at the proper drop-off location, the controller 70 uses information from the interior sensor system 54 to determine whether the user has left any personal items in the passenger cabin, adjacent one of the seats, at 120. For example, the controller 70 may be able to review the images from the interior sensor system 54 and determine that an article associated with the user is still present in the passenger cabin. If such a determination is made, at 122, an alert is issued. The alert may be audible, sent to the user's mobile device 74, and/or displayed on the exterior display system 28.

At step 124, the controller 70 also uses information from the interior sensor system 54, as well as the information stored at step 106, to determine whether the user loaded any luggage into the vehicle during boarding 102. If the user loaded luggage into the cargo area 48, and the controller 70 has not determined that weight has been removed from the storage area, at 126, then an alert is issued, at 128. As above, the alert may be audible, sent to the user's mobile device 74, and/or displayed on the exterior display system 28.

Each of these alerts issued at steps 118, 122, 128 are examples of actions that prevent unwanted dismissal of the autonomous vehicle 10. The alerts 118, 122, 128 themselves alert user to the potential problem, at which point it is incumbent on the user to resolve the underlying condition, such as by exiting the vehicle at their designated drop-off location, removing their personal items from the passenger cabin, or retrieving their luggage from the cargo area 48. The controller 70 may prevent the autonomous vehicle from being dismissed until the conditions are resolved. Further, providing the alerts eliminates confusion about why the autonomous vehicle 10 cannot be dismissed.

In another aspect of this disclosure, the controller 70 uses information from the exterior and interior sensor systems 12, 54 to determine the side of the autonomous vehicle 10 that the passenger has exited, at 130. In one example, the controller 70 determines which seat 40, 42, 44, 46, 50, 52 the passenger was sitting in during the ride, and tries to best approximate which side the autonomous vehicle 10 the passenger will exit. The controller 70 may use facial recognition to determine if the passenger has changed seats during the ride and may update the approximated exit side, if appropriate. The controller 70 may also suggest that the passenger exit a particular side of the autonomous vehicle 10 due to traffic conditions, for example. Regardless, the controller 70 uses information from the exterior and interior sensor systems 12, 54 to determine and verify the side of the autonomous vehicle 10 that the passenger has exited. The controller 70 may use triangulation to determine the position of the user, again using information from the exterior and interior sensor systems 12, 54.

Once determined, the controller 70, at 132, activates only the side-facing exterior displays 36, 38 on the side corresponding to the side which the user has exited. Further, the controller 70, at 132, activates only a section of the side-facing displays that correspond to a determined height of the user. Specifically, the controller 70 may determine a height 84 at which the input image 82 should be displayed using information from the exterior sensor system 12, the user's profile, and/or a lookup table that converts the user's height to an appropriate input image height.

Figure 9:
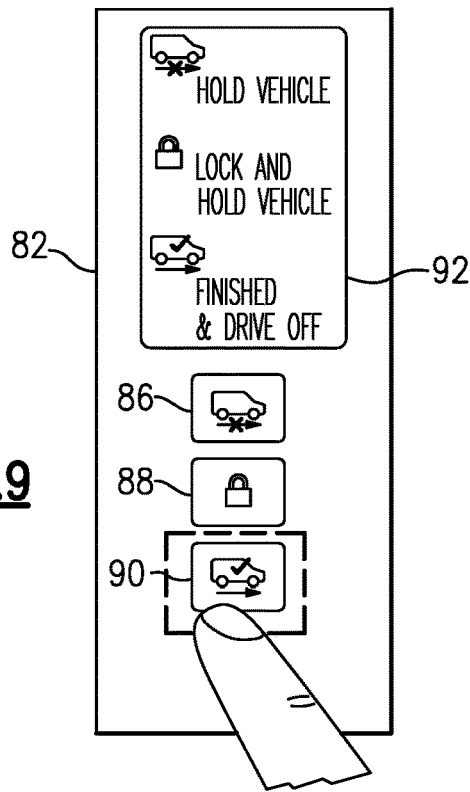
FIG. 9 illustrates a first example input image configured to be displayed on one of the side-facing exterior displays.

The activated section of the side-facing display may allow a user to provide various inputs, such as those shown in FIG. 9. FIG. 9 is representative of an example input image 82. In the input image 82, the user is presented with three buttons 86, 88, 90. Above the buttons is a panel 92 explaining the buttons 86, 88, 90 in an intuitive way. In this example, the first button 86 may be pressed in order to hold the autonomous vehicle 10, such as if the user anticipates a lengthy unloading process (e.g., a large item is in the cargo area 48) and/or additional passengers are still exiting the autonomous vehicle 10. The second button 88 may be pressed in order to lock and hold the autonomous vehicle 10. This button may be useful when a lengthy unloading process is expected and there are no additional passengers expected to exit the autonomous vehicle 10 at the particular drop-off location. Finally, the third button 90 may be pressed when the autonomous vehicle 10 may be dismissed. The third button 90 is pressed when the unloading operations are complete and it is safe for the autonomous vehicle 10 to drive away. When a user presses the third button 90, the controller 70 interprets that input as an indication that any conditions requiring the autonomous vehicle 10 to remain stationary have been resolved.

The buttons 86, 88, 90 could be tampered with by pranksters or inadvertently hit by children, as examples. Making the buttons 86, 88, 90 accessible only on the side the passenger has exited, and only at a height corresponding to the passenger's height reduces the chances that an unwanted dismissal of the autonomous vehicle 10 will occur. In this way, security is increased. While the buttons 86, 88, 90 may be conveniently accessed on the side-facing exterior displays 36, 38, the buttons 86, 88, 90 may also be accessed on the user's mobile device 74, which also has the benefit of increasing security.

Figure 10:
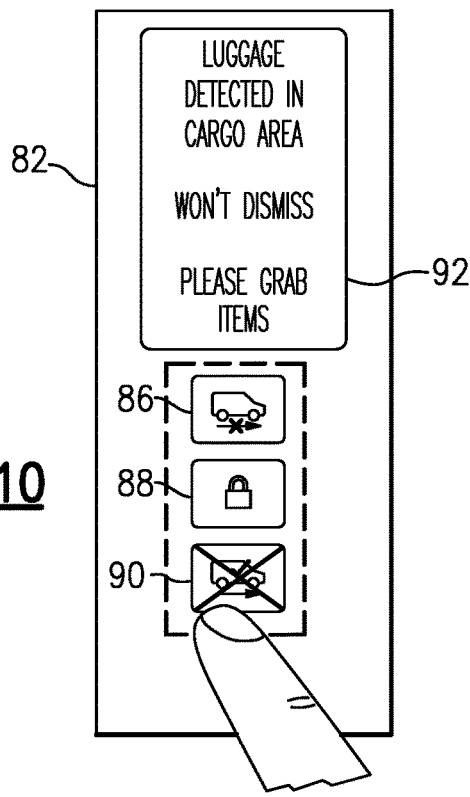
FIG. 10 illustrates a second example input image. In the second input image, access to one of the buttons is restricted.

Further, one or more of the buttons 86, 88, 90 may be disabled, and in particular the button 90 may be disabled, during a condition where the autonomous vehicle 10 should remain stationary, such as when someone is actively egressing the autonomous vehicle 10 or when the cargo area 48 is being unloaded. FIG. 10 is representative of the input image 82 with one or more of the button(s) disabled. Specifically, in FIG. 10, the button 90 is disabled, as indicated by the "X" through it. When one or more of the buttons 86, 88, 90 is disabled, the input image 82 may display a message via the panel 92, for example, explaining the reason why the button(s) are disabled. In this way, potential confusion is reduced or eliminated altogether.

In other aspects of this disclosure, facial recognition is performed using information from the exterior sensor system 12 to determine that the person pressing the buttons 86, 88, 90 is the proper user. The controller 70 may compare an image from the user's profile, for example, with images obtained by the exterior sensor system 12. In another aspect of this disclosure, the input image 82 will only be displayed once a user inputs a code, such as a numerical code. The code may be provided to the user via their mobile device 74. While codes and facial recognition have been mentioned, this disclosure extends to other authenticated inputs, such as thumbprint scans, etc.

If a user forgets to trigger a dismissal, and instead walks away from the autonomous vehicle 10 without pressing the button 90, for example, the autonomous vehicle 10 may interpret the user leaving the area adjacent the autonomous vehicle 10 as a dismissal. The autonomous vehicle 10 may determine that the user has left the vehicle using information from the exterior sensor system 12. In particular, the exterior sensor system 12 may determine the user's location using BLE signals sent to the mobile device 74, or by tracking the position of the mobile device 74 using global positioning system (GPS) signals.

Once a dismissal is triggered, at 134, a countdown may begin, at 136. The countdown may be a visual and/or audible countdown played inside and/or outside the autonomous vehicle 10. The countdown may alert passengers inside the autonomous vehicle 10 to the upcoming departure. The countdown may also alert those outside the autonomous vehicle 10 to clear away from the area as the autonomous vehicle 10 intends to soon move. The countdown may be of a predetermined time, such as 10 seconds. During the countdown, a user or passenger may override the dismissal, at 138. The override may come in the form of an input via the human-machine interface 72, the mobile device 74, or via the side-facing exterior displays 36, 38. As one example, a user may have unwittingly dismissed the autonomous vehicle 10 without knowing another passenger was exiting at that same drop-off location. In that instance, the passenger may trigger the override. The countdown provides an added layer of protection against pranksters and accidental dismissals.

In another aspect of this disclosure, a user that commonly travels in groups with others, and in particular with elderly persons or children, may be established as an "authority rider." A user may establish themselves as an authority rider within a software application on their mobile device 74. During trips where the user is traveling with other passengers, the controller 70 will only permit the authority rider to dismiss the autonomous vehicle 10. The controller 70 may use facial recognition to ensure that the authority rider is the one pressing the dismissal button, for example. In other examples, the authority rider is not linked to a person traveling with other users, but is instead the passenger traveling to the furthest destination or, alternatively, is the last passenger to book a ride. Further still, the authority rider may be the passenger corresponding to a particular drop-off location. Thus, the passenger exiting the autonomous vehicle 10 is the only person with authority to dismiss the autonomous vehicle 10. These features provide additional protection against malicious, false, and otherwise unwanted dismissals.

Finally, the doors of the autonomous vehicle 10 may close, at 140, and the autonomous vehicle 10 may continue on with its journey or begin a new one. In other examples, the doors of the autonomous vehicle 10 close after the passengers corresponding to a particular drop-off location have exited the autonomous vehicle 10, and the side-facing displays 36, 38 are not activated until the doors have closed. In other words, step 140 may occur before step 132. In this way, there is no access to the input image 82 before passengers exit the autonomous vehicle 10. This provides additional protection against malicious dismissals. Further, following step 140, the autonomous vehicle 10 may not immediately depart if additional passengers are expected to board the autonomous vehicle 10 at the drop-off location. In that example, the autonomous vehicle 10 may remain stationary with the doors locked to protect the remaining passengers until the new riders approach the autonomous vehicle 10 and begin boarding.

It should be understood that terms such as "about," "substantially," and "generally" are not intended to be boundaryless terms, and should be interpreted consistent with the way one skilled in the art would interpret those terms. It should also be understood that terms such as "forward," "rear," "side," etc., are used herein relative to the normal operational attitude of the autonomous vehicle 10 for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:
identifying a condition indicating an autonomous vehicle should remain stationary, wherein the identifying step is performed by a controller of the autonomous vehicle based on information from at least one sensor; and
taking an action configured to prevent unwanted dismissal of the autonomous vehicle when the condition has been identified, wherein the action is taken in response to a command from the controller,
wherein the action includes permitting a user to exit on only one side of the autonomous vehicle.

2. The method as recited in claim 1, further comprising:
permitting dismissal of the autonomous vehicle when the identified condition has been resolved.

3. The method as recited in claim 2, wherein:
dismissal is permitted only after a countdown occurs, and the user is permitted to override the dismissal during the countdown.

4. The method as recited in claim 2, further comprising:
determining the identified condition has been resolved by interpreting an input from the user.

5. The method as recited in claim 4, wherein dismissal is permitted only when an authenticated input is received.

6. The method as recited in claim 4, wherein:
the autonomous vehicle includes a first human-machine interface on a first side of the autonomous vehicle and a second human-machine interface on a second side of the autonomous vehicle opposite the first side, and
the first and second human-machine interfaces permit the user to provide the input.

7. The method as recited in claim 6, wherein the first and second human-machine interfaces are touch screens.

8. The method as recited in claim 1, wherein:
the condition includes a personal article remaining in the autonomous vehicle, and
the action includes issuing an alert indicating the personal article remains in the autonomous vehicle.

9. The method as recited in claim 1, wherein:
the condition includes luggage remaining in a cargo area of the autonomous vehicle, and
the action includes issuing an alert indicating the luggage remains in the cargo area of the autonomous vehicle.

10. The method as recited in claim 1, wherein:
the condition includes the user actively exiting the autonomous vehicle.

11. The method as recited in claim 1, wherein:
the condition includes the user failing to begin a process of exiting the autonomous vehicle within a predetermined time of the autonomous vehicle arriving at a destination of the user.

12. A method, comprising:
identifying a condition indicating an autonomous vehicle should remain stationary;
taking an action configured to prevent unwanted dismissal of an autonomous vehicle when the condition has been identified;
permitting dismissal of the autonomous vehicle when the identified condition has been resolved;
determining the identified condition has been resolved by interpreting an input from a user;
wherein the autonomous vehicle includes a first human-machine interface on a first side of the autonomous vehicle and a second human-machine interface on a second side of the autonomous vehicle opposite the first side, wherein the first and second human-machine interfaces permit the user to provide the input, and wherein the action includes activating only one of the first human-machine interface and the second human-machine interface based on a side of the autonomous vehicle the user has exited.

13. The method as recited in claim 12, wherein the side is determined based on a location where the user was seated within the autonomous vehicle.

14. The method as recited in claim 12, wherein the action further includes activating only a portion of the activated one of the first human-machine interface and the second human-machine interface based on a height of the user.

15. A system for an autonomous vehicle, comprising:
at least one sensor; and
a controller in electronic communication with the at least one sensor, wherein the controller is configured to interpret information from the at least one sensor to identify a condition indicating the autonomous vehicle should remain stationary, and, when the condition is identified, the controller is further configured to issue a command to prevent unwanted dismissal of the autonomous vehicle;
first and second human-machine interfaces on opposite sides of the autonomous vehicle, wherein the first and second human-machine interfaces are configured to be selectively activated in response to the command from the controller, wherein the controller is configured to issue a command activating only one of the first and second human-machine interfaces based on a side of the autonomous vehicle a user has exited, and wherein the controller is configured to issue a command activating only a portion of the activated one of the first and second human-machine interfaces based on a height of the user.

16. The system as recited in claim 15, wherein the at least one sensor includes at least one of a camera, weight sensor, and a wireless sensor.

17. The system as recited in claim 15, wherein the condition includes one or more of a personal article remaining in the autonomous vehicle, the user actively exiting the autonomous vehicle, or the user failing to begin a process of exiting the autonomous vehicle within a predetermined time of the autonomous vehicle arriving at a destination of the user.

* * * * *